US012782618B2

(12) United States Patent
Imamura et al.

(10) Patent No.: US 12,782,618 B2
(45) Date of Patent: Nov. 3, 2026

(54) OPTICAL FILTER INCLUDING CUBIC HAFNIUM OXIDE CRYSTAL, METHOD FOR PRODUCING SAME, AND STERILIZATION DEVICE INCLUDING OPTICAL FILTER

(71) Applicant: NIPPON ELECTRIC GLASS CO., LTD., Otsu (JP)

(72) Inventors: Tsutomu Imamura, Otsu (JP); Keiichi Sahara, Otsu (JP); Tomoyoshi Nakamuro, Otsu (JP); Masaaki Imura, Otsu (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 605 days.

(21) Appl. No.: 18/020,296

(22) PCT Filed: Aug. 19, 2021

(86) PCT No.: PCT/JP2021/030344

§ 371 (c)(1),
(2) Date: Feb. 8, 2023

(87) PCT Pub. No.: WO2022/039216

PCT Pub. Date: Feb. 24, 2022

(65) Prior Publication Data

US 2023/0305204 A1 Sep. 28, 2023

(30) Foreign Application Priority Data

Aug. 20, 2020 (JP) ................................ 2020-139174
Dec. 11, 2020 (JP) ................................ 2020-205684
Jun. 16, 2021 (JP) ................................ 2021-100430

(51) Int. Cl.
*G02B 5/20* (2006.01)
*G02B 5/22* (2006.01)
*G02B 5/28* (2006.01)

(52) U.S. Cl.
CPC ............ *G02B 5/208* (2013.01); *G02B 5/226* (2013.01); *G02B 5/285* (2013.01)

(58) Field of Classification Search
CPC ................................ G02B 5/208; G02B 5/285
See application file for complete search history.

(56) References Cited

U.S. PATENT DOCUMENTS 3,936,136 A 2/1976 Ikeda et al.
2005/0063045 A1 3/2005 Sakakibara et al.
(Continued)

FOREIGN PATENT DOCUMENTS

CN 14-51159 * 10/2003 ............ G11B 5/738
CN 109966652 A 7/2019
(Continued)

OTHER PUBLICATIONS

Official Communication issued in International Patent Application No. PCT/JP2021/030344, mailed on Nov. 2, 2021.
(Continued)

*Primary Examiner* — Lauren Nguyen
(74) *Attorney, Agent, or Firm* — Keating & Bennett, LLP

(57) ABSTRACT

There is provided an optical filter capable of effectively transmitting ultraviolet light in a wavelength range from 220 nm to 225 nm while suppressing the transmission of ultraviolet light in a wavelength range from 240 nm to 320 nm. An optical filter 1 includes a transparent substrate 2 and a dielectric multilayer film 3 provided on the transparent substrate 2 and containing hafnium oxide. A minimum value of spectral transmittance in a wavelength range from 220 nm to 225 nm is 50% or more with an incident angle of 0 degrees, and a maximum value of spectral transmittance in a wavelength range from 240 nm to 320 nm is 5% or less with an incident angle of 0 degrees.

17 Claims, 8 Drawing Sheets

(56) References Cited

U.S. PATENT DOCUMENTS

| | | | |
|---|---|---|---|
| 2008/0055584 A1 | 3/2008 | Pradhan et al. | |
| 2013/0299865 A1* | 11/2013 | Bechtel | H10H 20/851 257/98 |
| 2018/0169279 A1 | 6/2018 | Randers-Pehrson et al. | |
| 2018/0202071 A1* | 7/2018 | Kawarazaki | H01L 21/2686 |
| 2019/0192708 A1* | 6/2019 | Igarashi | G02B 5/283 |
| 2019/0192709 A1 | 6/2019 | Igarashi | |
| 2019/0321499 A1 | 10/2019 | Igarashi | |
| 2021/0030906 A1 | 2/2021 | Igarashi | |
| 2022/0339467 A1 | 10/2022 | Meinke et al. | |
| 2022/0379137 A1 | 12/2022 | Igarashi | |

FOREIGN PATENT DOCUMENTS

| | | |
|---|---|---|
| EP | 0 372 438 A2 | 6/1990 |
| JP | 02-192189 A | 7/1990 |
| JP | 2003-139945 A | 5/2003 |
| JP | 2013-068885 A | 4/2013 |
| JP | 2014032213 A | 2/2014 |
| WO | 2021043554 A1 | 3/2021 |
| WO | 2022046641 A1 | 3/2022 |
| WO | 2022148746 A1 | 7/2022 |

OTHER PUBLICATIONS

Official Communication issued in corresponding European Patent Application No. 21858360.7, mailed on Aug. 13, 2024, 8 pages.

Official Communication issued in corresponding Chinese Patent Application No. 202180051110.9, mailed on Sep. 13, 2025, 8 pages.

Abromavicius et al., “High temperature annealing effects on spectral, microstructural and laser damage resistance properties of sputtered HfO2 and HfO2—SiO2 mixture-based UV mirrors”, Optical Materials vol. 95, 2019, pp. 1-7.

Jena et al., “Annealing effects on microstructure and laser-induced damage threshold of HfO2/SiO2 multilayer mirrors”, Applied Optics vol. 55, No. 22, Aug. 1, 2016, 7 pages.

* cited by examiner

OPTICAL FILTER INCLUDING CUBIC HAFNIUM OXIDE CRYSTAL, METHOD FOR PRODUCING SAME, AND STERILIZATION DEVICE INCLUDING OPTICAL FILTER

TECHNICAL FIELD

The present invention relates to an optical filter capable of selectively transmitting light in a specific wavelength range, a method for producing the optical filter, and a sterilization device using the optical filter.

BACKGROUND ART

Optical filters capable of selectively transmitting light in a specific wavelength range have been widely used for various applications. As such optical filters, bandpass filters using dielectric films are known.

For example, Patent Document 1 cited below discloses a bandpass filter formed in such a manner that transmittance is largest with respect to specific ultraviolet light having a wavelength of 250 nm or less. In the bandpass filter of Patent Document 1, upper and lower sides of a cavity layer formed of a dielectric film are covered with metal thin films. Patent Document 1 describes that the metal thin films have such a film thickness that the transmittance of light having a wavelength in the visible range is 10% or less in the bandpass filter. Patent Document 1 also describes that the cavity layer is formed of a dielectric film, and as the dielectric material, silicon dioxide, lanthanum fluoride, magnesium fluoride, aluminum oxide, hafnium oxide, or the like is used.

CITATION LIST

Patent Literature

Patent Document 1: JP 2013-068885 A

SUMMARY OF INVENTION

Technical Problem

In sterilization treatment by ultraviolet light such as sterilization treatment against bacteria and viruses adhering to the skin or the like, an excimer lamp configured to emit ultraviolet light having a wavelength from 220 nm to 225 nm, or the like is used. However, the excimer lamp has a problem: ultraviolet light having a wavelength from 240 nm to 320 nm, which is harmful light to the human body, is slightly emitted therefrom.

Even in the case of using a bandpass filter as in Patent Document 1, it is difficult to sufficiently suppress the transmission of such ultraviolet light in a wavelength range from 240 nm to 320 nm. In particular, when it is attempted to suppress the transmission of ultraviolet light in a wavelength range from 240 nm to 320 nm, it is difficult, on the other hand, to sufficiently transmit ultraviolet light in a wavelength range from 220 nm to 225 nm, and thus, there arises a problem: it is difficult to suppress the transmission of the ultraviolet light harmful to the human body and to highly efficiently transmit the ultraviolet light useful for sterilization treatment at the same time at a high level.

An object of the present invention is to provide an optical filter capable of effectively transmitting ultraviolet light in a wavelength range from 220 nm to 225 nm while suppressing the transmission of ultraviolet light in a wavelength range from 240 nm to 320 nm, a method for producing the optical filter, and a sterilization device using the optical filter.

Solution to Problem

An optical filter according to the present invention, includes a transparent substrate and a dielectric multilayer film provided on the transparent substrate and containing hafnium oxide. A minimum value of spectral transmittance in a wavelength range from 220 nm to 225 nm is 50% or more with an incident angle of 0 degrees, and a maximum value of spectral transmittance in a wavelength range from 240 nm to 320 nm is 5% or less with an incident angle of 0 degrees.

In the present invention, the dielectric multilayer film preferably contains a cubic hafnium oxide crystal.

In the present invention, in X-ray diffraction measurement, a diffraction peak by a (1 1 1) crystal plane derived from a cubic hafnium oxide crystal is preferably larger than a diffraction peak by a (−1 1 1) crystal plane derived from a monoclinic hafnium oxide crystal.

In the present invention, the dielectric multilayer film includes a high refractive index film having a relatively high refractive index and a low refractive index film having a relatively low refractive index, and the high refractive index film preferably contains the hafnium oxide. The low refractive index film more preferably contains silicon oxide.

In the present invention, the outermost layer of the dielectric multilayer film is preferably a film containing the hafnium oxide. The thickness of the outermost layer is more preferably 1 nm or more and 10 nm or less.

In the present invention, it is preferable that a ratio ($T_{30}/T_0$) of spectral transmittance $T_{30}$ at a wavelength of 222 nm with an incident angle of 30 degrees to spectral transmittance $T_0$ at a wavelength of 222 nm with an incident angle of 0 degrees be 0.5 or more.

In the present invention, the dielectric multilayer film includes a high refractive index film having a relatively high refractive index and a low refractive index film having a relatively low refractive index, and a ratio ($t_H/t_L$) of a total thickness $t_H$ of the high refractive index film to a total thickness $t_L$ of the low refractive index film is preferably 0.2 or more. The ratio ($t_H/t_L$) of the total thickness $t_H$ of the high refractive index film to the total thickness $t_L$ of the low refractive index film is more preferably 0.5 or more.

In the present invention, with an incident angle of 0 degrees, it is preferable that the minimum value of the spectral transmittance in a wavelength range from 220 nm to 225 nm be 50% or more, and the maximum value of the spectral transmittance in a wavelength range from 237 nm to 280 nm be 10% or less.

In the present invention, with an incident angle of 40 degrees, it is preferable that the maximum value of the spectral transmittance in a wavelength range from 237 nm to 280 nm be 20% or less.

In the present invention, a method for producing an optical filter is a method for producing the optical filter constituted in accordance with an aspect of the present invention. The method includes producing a transparent substrate with a film by depositing a dielectric multilayer film containing hafnium oxide on the transparent substrate by sputtering method, and heating the transparent substrate with the film at a temperature of 500° C. or higher.

In the present invention, the temperature for the heating of the transparent substrate with the film is preferably 800° C. or lower.

A sterilization device according to the present invention is a device for performing inactivation treatment on microorganisms to be treated, and includes a light source configured to emit light whose wavelength is in a wavelength range from 190 nm to 230 nm, and the optical filter constituted in accordance with the present invention.

Advantageous Effects of Invention

According to the present invention, an optical filter capable of effectively transmitting ultraviolet light in a wavelength range from 220 nm to 225 nm while suppressing the transmission of ultraviolet light in a wavelength range from 240 nm to 320 nm, a method for producing the optical filter, and a sterilization device using the optical filter may be provided.

DESCRIPTION OF EMBODIMENTS

Preferred embodiments are described below. However, the following embodiments are merely examples, and the present invention is not limited to the following embodiments. In each of the drawings, members having substantially the same function may be denoted by the same reference sign.

First Embodiment

Optical Filter

Figure 1:
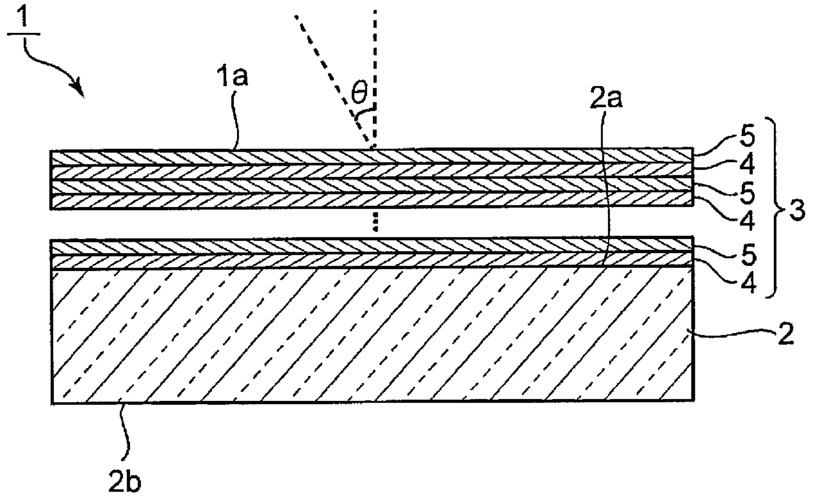
FIG. 1 is a schematic cross-sectional view illustrating an optical filter according to a first embodiment of the present invention.

FIG. 1 is a schematic cross-sectional view illustrating an optical filter according to a first embodiment of the present invention. As illustrated in FIG. 1, an optical filter 1 includes a transparent substrate 2 and a dielectric multilayer film 3. The dielectric multilayer film 3 is provided on the transparent substrate 2.

In the present embodiment, the transparent substrate 2 has a rectangular plate shape. The transparent substrate 2 may have a shape such as a disc shape, for example, and the shape thereof is not particularly limited.

The thickness of the transparent substrate 2 is not particularly limited, and may be appropriately set in accordance with light transmittance or the like. The thickness of the transparent substrate 2 may be approximately from 0.1 mm to 30 mm, for example.

The transparent substrate 2 is preferably a substrate that is transparent in a usage wavelength range of the optical filter 1. More specifically, in the transparent substrate 2, it is preferable for the average light transmittance of the ultraviolet wavelength range to be 80% or more in a wavelength range from 220 nm to 225 nm.

The material of the transparent substrate 2 is not particularly limited, and examples thereof include glass, resin and the like. Examples of the glass include quartz glass, borosilicate glass and the like. The quartz glass may be synthetic quartz glass or molten quartz glass. The borosilicate glass preferably contains 55% to 75% of $SiO_2$, 1% to 10% of $Al_2O_3$, 10% to 30% of $B_2O_3$, 0% to 5% of CaO, 0% to 5% of BaO and 1.0% to 15% of ($Li_2O+Na_2O+K_2O$), and more preferably further contains 0% to 0.001% of $TiO_2$, 0% to 0.001% of $Fe_2O_3$ and 0.5% to 2.0% of F, as glass composition in terms of mass %.

The transparent substrate 2 has a first principal surface 2*a* and a second principal surface 2*b* opposing each other. The dielectric multilayer film 3 is provided as a filter portion on the first principal surface 2*a* of the transparent substrate 2.

The dielectric multilayer film 3 is a multilayer film including a high refractive index film 4 having a relatively high refractive index and a low refractive index film 5 having a relatively low refractive index. In the present embodiment, the high refractive index film 4 and the low refractive index film 5 are alternately laminated in that order on the first principal surface 2*a* of the transparent substrate 2 to constitute the multilayer film.

The high refractive index film 4 is formed of hafnium oxide, and is a film including hafnium oxide as a main ingredient. In the present specification, a film including a material as a main ingredient refers to a film including 50 mass % or more of the material in the film. It goes without saying that the film may contain 100 mass % of the material therein.

In the present embodiment, the low refractive index film 5 is formed of silicon oxide, and is a film including the silicon oxide as a main ingredient. The low refractive index film 5 may be a film including aluminum oxide, zirconium oxide, magnesium fluoride, silicon nitride, or the like as a main ingredient. One type of these materials may be used alone or multiple types thereof may be used together for the low refractive index film 5.

The thickness of one layer of the high refractive index film 4 is not particularly limited, but is preferably 5 nm or more and more preferably 10 nm or more, and preferably 60 nm or less and more preferably 50 nm or less.

The thickness of one layer of the low refractive index film 5 is not particularly limited, but is preferably 5 nm or more and more preferably 10 nm or more, and preferably 80 nm or less and more preferably 60 nm or less.

The entire thickness of the dielectric multilayer film 3 is not particularly limited, but is preferably 1000 nm or more and more preferably 1500 nm or more, and preferably 3000 nm or less and more preferably 2000 nm or less.

The number of layers of the film constituting the dielectric multilayer film 3 is preferably 20 or more and more preferably 30 or more, and preferably 100 or less and more preferably 80 or less.

The optical filter 1 of the present embodiment is a bandpass filter designed to selectively transmit light in a specific wavelength range by utilizing interference of light with the above-discussed dielectric multilayer film 3 included in the optical filter. Specifically, the bandpass filter is designed in such a manner that the minimum value of the spectral transmittance in a wavelength range from 220 nm to 225 nm is 50% or more, and the maximum value of the spectral transmittance in a wavelength range from 240 nm to 320 nm is 5% or less.

In this specification, the spectral transmittance may be determined by measuring the spectral transmittance of the entire optical filter 1 with a spectral transmittance meter (manufactured by Hitachi High-Tech Corporation, Product Number "UH4150"), for example. The measurement conditions may be such that the measurement is performed from the side of a principal surface 1*a* of the optical filter 1, the incident angle is 0 degrees, and the measurement wavelength is from 190 nm to 400 nm, for example.

As described above, the features of the optical filter 1 according to the present embodiment are such that the dielectric multilayer film 3 containing hafnium oxide is provided on the transparent substrate 2, the minimum value of the spectral transmittance in a wavelength range from 220 nm to 225 nm is 50% or more, and the maximum value of the spectral transmittance in a wavelength range from 240 nm to 320 nm is 5% or less. In this case, an incident angle θ to be described below is 0 degrees.

This allows the optical filter 1 to effectively transmit ultraviolet light in a wavelength range from 220 nm to 225 nm while suppressing the transmission of ultraviolet light in a wavelength range from 240 nm to 320 nm.

As described above, the optical filter 1 can suppress the transmission of ultraviolet light in a wavelength range from 240 nm to 320 nm, and thus can suppress the transmission of ultraviolet light harmful to the human body. Since the transmittance of ultraviolet light in a wavelength range from 220 nm to 225 nm is excellent, ultraviolet light useful for sterilization treatment such as skin sterilization treatment can be effectively transmitted.

Therefore, the optical filter 1 of the present embodiment, for example, when used together with an ultraviolet irradiation device such as an excimer lamp, can effectively transmit ultraviolet light useful for sterilization treatment while suppressing the transmission of ultraviolet light harmful to the human body.

In the present invention, the minimum value of the spectral transmittance in a wavelength range from 220 nm to 225 nm is preferably 60% or more, and more preferably 70% or more. In this case, ultraviolet light useful for sterilization treatment such as skin sterilization treatment can be more effectively transmitted. The upper limit value of the minimum value of the spectral transmittance in a wavelength range from 220 nm to 225 nm is not particularly limited, but may be, for example, 95%. In this case, an incident angle θ to be described below is 0 degrees.

In the present invention, the maximum value of the spectral transmittance in a wavelength range from 240 nm to 320 nm is preferably 3% or less, more preferably 2.5% or less, and further preferably 1% or less. In this case, the transmission of ultraviolet light harmful to the human body can be more effectively suppressed. The lower limit value of the maximum value of the spectral transmittance in a wavelength range from 240 nm to 320 nm is not particularly limited, but may be, for example, 0.2%. In this case, an incident angle θ to be described below is 0 degrees.

In the optical filter 1 of the present embodiment, it is preferable that the ratio ($T_{30}/T_0$) of spectral transmittance $T_{30}$ at a wavelength of 222 nm with an incident angle of 30 degrees to spectral transmittance $T_0$ at a wavelength of 222 nm with an incident angle of 0 degrees be 0.5 or more. When a lamination direction (thickness direction) of the dielectric multilayer film 3 orthogonal to a direction along the principal surface 1*a* of the optical filter 1 is taken as a normal direction, the incident angle refers to an angle inclined with respect to the normal direction (for example, θ in FIG. 1). Accordingly, the direction along the normal direction takes an incident angle of 0 degrees.

In this case, the spectral transmittance may be determined by measuring the spectral transmittance of the entire optical filter 1 with a spectral transmittance meter (manufactured by Hitachi High-Tech Corporation, Product Number "UH4150"), for example. The measurement conditions may be such that the measurement is performed from the principal surface 1*a* side of the optical filter 1, and the measurement wavelength is from 190 nm to 400 nm, for example.

In the optical filter 1 of the present embodiment, since the ratio ($T_{30}/T_0$) of the spectral transmittance $T_{30}$ at a wavelength of 222 nm with the incident angle of 30 degrees to the spectral transmittance $T_0$ at the wavelength of 222 nm with the incident angle of 0 degrees is the above-described lower limit value or more, ultraviolet light useful for sterilization treatment can be more efficiently transmitted even when the incident angle of the emitted light from the light source is large. This makes it possible to further increase an effective irradiation area of the emitted light from the light source.

In the present invention, the ratio ($T_{30}/T_0$) of the spectral transmittance $T_{30}$ at a wavelength of 222 nm with an incident angle of 30 degrees to the spectral transmittance $T_0$ at a wavelength of 222 nm with an incident angle of 0 degrees is preferably from 0.6 or more, more preferably 0.7 or more, further preferably 0.8 or more, particularly preferably 0.9 or more, and preferably 1.0 or less. When the ratio ($T_{30}/T_0$) falls within the above range, ultraviolet light useful for sterilization treatment can be more efficiently transmitted even when the incident angle of the emitted light from the light source is large.

In the present invention, the spectral transmittance $T_0$ at a wavelength of 222 nm with the incident angle of 0 degrees is preferably 60% or more, more preferably 70% or more, further preferably 75% or more, and particularly preferably 80% or more. In this case, ultraviolet light useful for sterilization treatment can be more efficiently transmitted. The upper limit value of the spectral transmittance $T_0$ at the wavelength of 222 nm with the incident angle of 0 degrees is more preferred as it is higher, and may be set to be 95%, for example.

The spectral transmittance $T_{30}$ at a wavelength of 222 nm with an incident angle of 30 degrees is preferably 40% or more, more preferably 50% or more, further preferably 60% or more, and particularly preferably 70% or more. In this case, an effective irradiation area of the emitted light from the light source can be further increased. The upper limit value of the spectral transmittance $T_{30}$ at the wavelength of 222 nm with the incident angle of 30 degrees is more preferred as it is higher, and may be set to be 93%, for example.

The spectral transmittance at a wavelength of 222 nm with an incident angle of 40 degrees is preferably 5% or more, more preferably 10% or more, further preferably 20% or more, and particularly preferably 30% or more. In this case, an effective irradiation area of the emitted light from the light source can be further increased. The upper limit value of the spectral transmittance at the wavelength of 222 nm with the incident angle of 40 degrees is more preferred as it is higher, and may be set to be 55%, for example.

In the present invention, with incident angle of 0 degrees, it is preferable that the minimum value of the spectral transmittance in a wavelength range from 220 nm to 225 nm be 50% or more, and the maximum value of the spectral transmittance in a wavelength range from 237 nm to 280 nm be 10% or less. In this case, it is possible to highly efficiently transmit ultraviolet light useful for sterilization treatment and to suppress the transmission of ultraviolet light harmful to the human body at the same time at a higher level.

The maximum value of the spectral transmittance in a wavelength range from 237 nm to 280 nm with an incident angle of 0 degrees is preferably 10% or less, more preferably 5% or less, further preferably 4% or less, particularly preferably 3% or less, and most preferably 2% or less. In this case, the transmission of ultraviolet light harmful to the human body can be further suppressed. The lower limit value of the maximum value of the spectral transmittance in a wavelength range from 237 nm to 280 nm with the incident angle of 0 degrees is more preferred as it is lower, and may be set to be 0.01%, for example.

The maximum value of the spectral transmittance in a wavelength range from 237 nm to 280 nm with an incident angle of 30 degrees is preferably 15% or less, more preferably 10% or less, further preferably 5% or less, particularly preferably 4% or less, and most preferably 3% or less. In this case, an effective irradiation area of the emitted light from the light source can be further increased. The lower limit value of the maximum value of the spectral transmittance in a wavelength range from 237 nm to 280 nm with the incident angle of 30 degrees is more preferred as it is lower, and may be set to be 0.01%, for example.

The maximum value of the spectral transmittance in a wavelength range from 237 nm to 280 nm with an incident angle of 40 degrees is preferably 20% or less, more preferably 15% or less, further preferably 10% or less, particularly preferably 7% or less, and most preferably 5% or less. In this case, an effective irradiation area of the emitted light from the light source can be further increased. The lower limit value of the maximum value of the spectral transmittance in a wavelength range from 237 nm to 280 nm with the incident angle of 40 degrees is more preferred as it is lower, and may be set to be 0.01%, for example.

The spectral transmittance at a wavelength of 222 nm with each incident angle and the spectral transmittance in a wavelength range from 237 nm to 280 nm with each incident angle can be adjusted by, for example, the film configuration of the dielectric multilayer film 3.

In the present invention, a total thickness $t_H$ of the high refractive index films 4 is preferably 250 nm or more, more preferably 300 nm or more, further preferably 400 nm or more and particularly preferably 500 nm or more, and preferably 1000 nm or less, more preferably 800 nm or less, further preferably 700 nm or less and particularly preferably 600 nm or less. With the total thickness $t_H$ of the high refractive index films 4 being the above-described lower limit value or more, the high spectral transmittance at the wavelength of 222 nm can be maintained more effectively even when the incident angle is large. The maximum value of the spectral transmittance in a wavelength range from 237 nm to 280 nm may be further decreased. On the other hand, in a case where the total thickness $t_H$ of the high refractive index films 4 is the above-described upper limit value or less, the spectral transmittance at the wavelength of 222 nm may be further increased.

The thickness of one layer of the high refractive index film 4 is not particularly limited, but is preferably 5 nm or more and more preferably 10 nm or more, and preferably 60 nm or less and more preferably 50 nm or less.

In the present invention, a total thickness $t_L$ of the low refractive index films 5 is preferably 500 nm or more, more preferably 600 nm or more, further preferably 700 nm or more and particularly preferably 800 nm or more, and preferably 2000 nm or less, more preferably 1700 nm or less, further preferably 1500 nm or less and particularly preferably 1400 nm or less. In a case where the total thickness $t_L$ of the low refractive index films 5 is the above-described lower limit value or more, the maximum value of the spectral transmittance in a wavelength range from 237 nm to 280 nm may be further lowered. On the other hand, in a case where the total thickness $t_L$ of the low refractive index films 5 is the above-described upper limit value or less, the spectral transmittance at the wavelength of 222 nm may be further increased.

The thickness of one layer of the low refractive index film 5 is not particularly limited, but is preferably 5 nm or more and more preferably 10 nm or more, and preferably 80 nm or less and more preferably 60 nm or less.

In the present invention, a ratio ($t_H/t_L$) of the total thickness $t_H$ of the high refractive index films 4 to the total thickness $t_L$ of the low refractive index films 5 is preferably 0.2 or more, more preferably 0.3 or more, further preferably 0.4 or more, particularly preferably 0.5 or more and most preferably 0.6 or more, and preferably 1 or less, more preferably 0.9 or less, further preferably 0.8 or less and particularly preferably 0.75 or less. In a case where the ratio ($t_H/t_L$) is the above-described lower limit value or more, the high spectral transmittance at the wavelength of 222 nm can be maintained more effectively even when the incident angle is large. In a case where the ratio ($t_H/t_L$) is the above-described upper limit value or less, the maximum value of the spectral transmittance in a wavelength range from 237 nm to 280 nm may be further lowered.

The total thickness of the dielectric multilayer film 3 is not particularly limited, but is preferably 800 nm or more, more preferably 1000 nm or more, further preferably 1100 nm or more and particularly preferably 1200 nm or more, and preferably 2500 nm or less, more preferably 2200 nm or less, further preferably 2000 nm or less and particularly preferably 1900 nm or less. In a case where the total thickness of the dielectric multilayer film 3 is the above-described lower limit value or more, the maximum value of the spectral transmittance in a wavelength range from 237 nm to 280 nm may be further decreased. On the other hand, in a case where the total thickness of the dielectric multilayer film 3 is the above-described upper limit value or less, the spectral transmittance at the wavelength of 222 nm may be further increased.

The number of layers of the film constituting the dielectric multilayer film 3 is preferably 20 or more, more preferably 25 or more, further preferably 30 or more and particularly preferably 35 or more, and preferably 100 or less, more preferably 80 or less, further preferably 60 or less and particularly preferably 45 or less. In a case where the number of layers of the film constituting the dielectric multilayer film 3 is the above-described lower limit value or more, the maximum value of the spectral transmittance in a wavelength range from 237 nm to 280 nm may be further decreased. In a case where the number of layers of the film constituting the dielectric multilayer film 3 is the above-described upper limit value or less, the spectral transmittance at the wavelength of 222 nm may be further increased.

In the present invention, the dielectric multilayer film 3 contains a hafnium oxide crystal. More specifically, the high refractive index film 4 constituting the dielectric multilayer film 3 preferably contains a hafnium oxide crystal, and more preferably contain a cubic hafnium oxide crystal. In this case, the transmittance of ultraviolet light in a wavelength range from 220 nm to 225 nm can be further increased while the transmission of ultraviolet light in a wavelength range from 240 nm to 320 nm is further suppressed.

In the present specification, whether the cubic hafnium oxide crystal is contained may be confirmed by whether the diffraction peak by the (1 1 1) crystal plane derived from the cubic hafnium oxide crystal is observed in the X-ray diffraction measurement.

In the present specification, the X-ray diffraction measurement may be performed by a wide angle X-ray diffraction technique. As an X-ray diffractometer, for example, "SmartLab", which is a product of Rigaku Corporation, may be used. As a radiation source, CuKα radiation may be used. In the X-ray diffraction measurement as well, the entire optical filter 1 is subjected to measurement from the first principal surface 2*a* side.

In the present invention, in the X-ray diffraction measurement, a diffraction peak by a (1 1 1) crystal plane derived from a cubic hafnium oxide crystal is preferably larger than a diffraction peak by a (−1 1 1) crystal plane derived from a monoclinic hafnium oxide crystal. In this case, the transmittance of ultraviolet light in a wavelength range from 220 nm to 225 nm can be further increased while the transmission of ultraviolet light in a wavelength range from 240 nm to 320 nm is further suppressed.

In the present invention, a ratio Ic/Im of a peak integrated intensity Ic of the diffraction peak by the (1 1 1) crystal plane derived from a cubic hafnium oxide crystal to a peak integrated intensity Im of the diffraction peak by the (−1 1 1) crystal plane derived from a monoclinic hafnium oxide crystal is preferably 0.1 or more, more preferably 0.3 or more, further preferably 1 or more, still preferably 2 or more, particularly preferably 2.5 or more, and most preferably 3 or more. In a case where the ratio Ic/Im is the above-described lower limit value or more, the transmittance of ultraviolet light in a wavelength range from 220 nm to 225 nm can be further increased while the transmission of ultraviolet light in a wavelength range from 240 nm to 320 nm is further suppressed. The upper limit value of the ratio Ic/Im is not particularly limited, but may be set to be, for example, 10000.

In the present invention, an anti-reflection film may be provided on the second principal surface 2*b* of the transparent substrate 2. In this case, the transmittance of ultraviolet light in a wavelength range from 220 nm to 225 nm can be further enhanced.

The anti-reflection film is not particularly limited, and for example, a multilayer film including a high refractive index film having a relatively high refractive index and a low refractive index film having a relatively low refractive index may be used. The multilayer film may be constituted by the high refractive index film and the low refractive index film being alternately provided in that order. As the high refractive index film, for example, a film including hafnium oxide as a main ingredient may be used. Examples of the low refractive index film include a film containing silicon oxide, aluminum oxide, zirconium oxide, tin oxide, silicon nitride or the like as a main ingredient. The number of layers of the film constituting the multilayer film may be, for example, 4 or more and 100 or less.

In the present invention, as long as the advantageous effects of the present invention are not hindered, a film other than an anti-reflection film may be laminated on the second principal surface 2*b* of the transparent substrate 2. Furthermore, as long as the advantageous effects of the present invention are not hindered, a film other than the dielectric multilayer film 3 may also be provided on the first principal surface 2*a* of the transparent substrate 2. In this case, the film may be provided between the transparent substrate 2 and the dielectric multilayer film 3, or may be provided on the dielectric multilayer film 3.

An example of a method for producing the optical filter 1 will be described in detail below.

Production Method for Optical Filter

The Step of Forming Transparent Substrate with Film;

First, the transparent substrate 2 is prepared. Subsequently, the dielectric multilayer film 3 is formed on the first principal surface 2*a* of the transparent substrate 2. The dielectric multilayer film 3 may be formed by alternately laminating the high refractive index film 4 and the low refractive index film 5 in that order on the first principal surface 2*a* of the transparent substrate 2. The high refractive index film 4 and the low refractive index film 5 may each be formed by sputtering method.

The temperature of the substrate when the high refractive index film 4 is deposited is preferably 300° C. or lower, and more preferably 270° C. or lower. In this case, in the resultant optical filter 1, ultraviolet light having a wavelength from 220 nm to 225 nm may be transmitted more effectively while the transmission of light having a wavelength from 240 nm to 320 nm is further suppressed. The lower limit value of the temperature of the substrate when the high refractive index film 4 is deposited may be, for example, 20° C.

The deposition of the high refractive index film 4 may be carried out, for example, by using a target of a material for constituting the high refractive index film 4, setting the flow rate of an inert gas such as an argon gas as a carrier gas to 50 sccm to 500 sccm, and applying power from 0.5 kW to 40 kW.

The deposition of the low refractive index film 5 may be carried out, for example, by using a target of a material for constituting the low refractive index film 5, setting the flow rate of an inert gas such as an argon gas as a carrier gas to 50 sccm to 500 sccm, and applying power from 0.5 kW to 40 kW.

The Step of Heating;

Next, the resultant transparent substrate with the film is heated at a temperature of, for example, 450° C. or higher. As a result, the optical filter 1 may be produced. In particular, when the transparent substrate with the film is heated at a temperature of 450° C. or higher, the content of the cubic hafnium oxide crystal can be made relatively larger. Due to this, in the produced optical filter 1, the transmittance of ultraviolet light in a wavelength range from 220 nm to 225 nm can be further increased while the transmission of ultraviolet light in a wavelength range from 240 nm to 320 nm is further suppressed.

The temperature for heating the transparent substrate with the film is preferably 500° C. or higher and more preferably 550° C. or higher, and preferably 800° C. or lower and more preferably 750° C. or lower. In a case where the heating temperature falls within the above-described range, the transmittance of ultraviolet light in a wavelength range from 220 nm to 225 nm can be further increased while the transmission of ultraviolet light in a wavelength range from 240 nm to 320 nm is further suppressed.

The period of time of heating the transparent substrate with the film is not particularly limited, but may be, for example, 10 minutes or more and 120 minutes or less.

In the present invention, in the X-ray diffraction measurement of the transparent substrate with the film before being heated, it is preferable that the intensity of the diffraction peak by the (−1 1 1) crystal plane derived from the monoclinic hafnium oxide crystal be small. The intensity of the diffraction peak by the (−1 1 1) crystal plane derived from the monoclinic hafnium oxide crystal is preferably at a microcrystalline level, and the height of the peak intensity is more preferably three times or less the height of the peak intensity of an amorphous halo. In this case, the ratio Ic/Im of the peak integrated intensity Ic of the diffraction peak by the (1 1 1) crystal plane derived from the cubic hafnium oxide crystal to the peak integrated intensity Im of the diffraction peak by the (−1 1 1) crystal plane derived from the monoclinic hafnium oxide crystal can be further increased by heating. Due to this, in the produced optical filter 1, the transmittance of ultraviolet light in a wavelength range from 220 nm to 225 nm can be further increased while the transmission of ultraviolet light in a wavelength range from 240 nm to 320 nm is further suppressed.

In the present invention, the transmittance of ultraviolet light in a wavelength range from 240 nm to 320 nm and the transmittance of ultraviolet light in a wavelength range from 220 nm to 225 nm may be adjusted by, for example, the total number of films constituting the dielectric multilayer film 3, the film thickness, the material, and the heating temperature of the transparent substrate with the film. In particular, in the produced optical filter 1, by the heating temperature of the transparent substrate with the film, the transmittance of ultraviolet light in a wavelength range from 220 nm to 225 nm can be further effectively increased while the transmission of ultraviolet light in a wavelength range from 240 nm to 320 nm is further suppressed.

The spectral transmittance at the wavelength of 222 nm with each incident angle, and the spectral transmittance in a wavelength range from 237 nm to 280 nm with each incident angle may also be adjusted by, for example, the heating temperature of the transparent substrate with the film in addition to the number of films constituting the dielectric multilayer film 3, the film thickness, and the material. In particular, in the produced optical filter 1, by the heating temperature of the transparent substrate with the film, the maximum value of the spectral transmittance in a wavelength range from 237 nm to 280 nm may be further lowered while the spectral transmittance at the wavelength of 222 nm is further increased.

Second Embodiment

Figure 4:
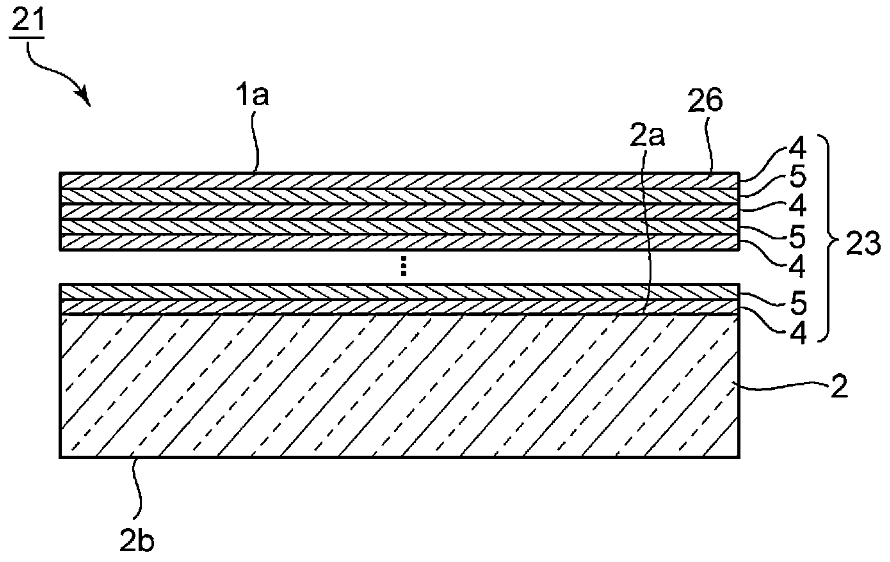
FIG. 4 is a schematic cross-sectional view illustrating an optical filter according to a second embodiment of the present invention.

FIG. 4 is a schematic cross-sectional view illustrating an optical filter according to a second embodiment of the present invention. As illustrated in FIG. 4, in an optical filter 21, an outermost layer 26 of a dielectric multilayer film 23 is a high refractive index film 4 constituted by hafnium oxide. Other points are similar to those in the first embodiment.

In the optical filter 21 as well, the minimum value of the spectral transmittance in a wavelength range from 220 nm to 225 nm is 50% or more, and the maximum value of the spectral transmittance in a wavelength range from 240 nm to 320 nm is 5% or less. This makes it possible to effectively transmit ultraviolet light in a wavelength range from 220 nm to 225 nm while suppressing the transmission of ultraviolet light in a wavelength range from 240 nm to 320 nm.

When an excimer lamp or the like configured to emit ultraviolet light having a wavelength from 220 nm to 225 nm is used, device members may be deteriorated by the irradiation with light, and an acid gas may be generated in some cases. The gas may erode the film of the optical filter to change the optical characteristics, and thus the required characteristics cannot be realized in some cases.

In contrast, when the outermost layer 26 is constituted by hafnium oxide as in the optical filter 21, it is allowed to further suppress the erosion by the acid gas, and further suppress the change in the optical characteristics.

The thickness of the outermost layer 26 is preferably 1 nm or more and more preferably 2 nm or more, and preferably 10 nm or less and more preferably 7 nm or less. When the thickness of the outermost layer 26 is the above-described lower limit value or more, it is allowed to further suppress the erosion by the acid gas, and further suppress the change in the optical characteristics. On the other hand, when the thickness of the outermost layer 26 is the above-described upper limit value or less, ultraviolet light in a wavelength range from 220 nm to 225 nm may be further effectively transmitted while the transmission of ultraviolet light in a wavelength range from 240 nm to 320 nm is further suppressed.

Sterilization Device

Figure 7:
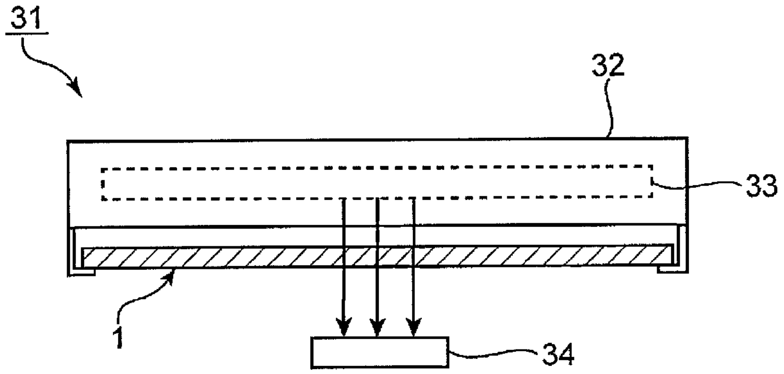
FIG. 7 is a schematic diagram illustrating a sterilization device according to an embodiment of the present invention.

FIG. 7 is a schematic diagram illustrating a sterilization device according to an embodiment of the present invention. As illustrated in FIG. 7, a sterilization device 31 includes a housing 32, a light source 33, and the optical filter 1. The light source 33 configured to emit light whose wavelength falls within a wavelength range from 190 nm to 230 nm is disposed inside the housing 32. The light source 33 and the optical filter 1 are provided facing each other. At this time, the dielectric multilayer film 3 is preferably provided on the light source 33 side. In the sterilization device 31, a sterilization target object 34 is irradiated with the emitted light from the light source 33 via the optical filter 1.

An excimer lamp, for example, may be used as the light source 33. An example of the excimer lamp that is preferably used includes an excimer lamp configured to emit ultraviolet light having a wavelength from 220 nm to 225 nm. An example of such excimer lamp that may be used includes a KrCl excimer lamp. The excimer lamp may be a KrBr excimer lamp.

In the sterilization device 31 of the present embodiment, since the optical filter 1 described above is used, ultraviolet light useful for sterilization treatment can be efficiently transmitted. As a result, ultraviolet sterilization can be efficiently performed on the sterilization target object 34. In the ultraviolet sterilization, the ultraviolet light is made to act on DNA inside the cells of a sterilization target organism such as bacteria, thereby making it possible to selectively inactivate the target. In the ultraviolet sterilization, the ultraviolet light is also made to act on viruses to make it possible to selectively inactivate the viruses. In particular, the sterilization device 31 is more preferably used for inactivating a treatment target microorganism.

Hereinafter, the present invention will be described in more detail based on specific examples. The present invention is not limited to the following examples in any way, and can be appropriately changed and implemented within a range that does not change the gist thereof.

Production Example 1

First, a synthetic quartz glass substrate (manufactured by USTRON Corporation) was prepared as a transparent substrate. Subsequently, a dielectric multilayer film was deposited by sputtering on a principal surface on one side of the prepared transparent substrate. Specifically, first, a hafnium target was sputtered using an argon gas and an oxygen gas as carrier gases, and thus a hafnium oxide film ($HfO_2$ film) was deposited on the principal surface on the one side of the transparent substrate. At this time, each of the flow rates of the argon gas and the oxygen gas was 100 sccm, and the target application power (power for deposition) was 4 kW. Subsequently, a silicon target was sputtered using the argon gas and the oxygen gas as the carrier gases, and thus a silicon oxide film ($SiO_2$ film) was deposited on the $HfO_2$ film. At this time, the flow rate of the argon gas and the oxygen gas was 100 sccm, and the target application power (power for deposition) was 4 kW. By repeating this operation, on the principal surface on the one side of the transparent substrate, the dielectric multilayer film including a film having a total of 38 layers was formed in which the $HfO_2$ film and the $SiO_2$ film were alternately laminated one layer by one layer, and thus the transparent substrate with the film was produced. The substrate temperature was maintained at room temperature (20° C.) during the deposition.

Production Example 2

A transparent substrate with a film was produced in the same manner as that in Production Example 1 except that the substrate temperature was maintained at 270° C. during the deposition.

Production Example 3

A transparent substrate with a film was produced in the same manner as that in Production Example 1 except that a molten quartz glass substrate (manufactured by USTRON Corporation) was used as a transparent substrate and the deposition was performed to cause each layer to have the film thickness as depicted in Table 1 below.

Production Example 4

A transparent substrate with a film was produced in the same manner as that in Production Example 1 except that a borosilicate glass substrate (manufactured by Nippon Electric Glass Co., Ltd., Product Number "BU-41") was used as a transparent substrate and the deposition was performed to cause each layer to have the film thickness as depicted in Table 1 below.

The thickness of each layer in the transparent substrates with films fabricated in Production Examples 1 to 4 is as depicted in Table 1 below.

TABLE 1

| Glass Side | | Production Example 1 | Production Example 2 | Production Example 3 | Production Example 4 | Production Example 6 |
|---|---|---|---|---|---|---|
| 1st Layer | $HfO_2$ | 37.9 nm | 37.9 nm | 36.8 nm | 36.8 nm | 35.5 nm |
| 2nd Layer | $SiO_2$ | 50.2 nm | 50.2 nm | 40.6 nm | 40.6 nm | 39.1 nm |
| 3rd Layer | $HfO_2$ | 34.7 nm | 34.7 nm | 33.5 nm | 33.5 nm | 32.2 nm |
| 4th Layer | $SiO_2$ | 58.4 nm | 58.4 nm | 47.9 nm | 47.9 nm | 46.2 nm |
| 5th Layer | $HfO_2$ | 33.9 nm | 33.9 nm | 35.0 nm | 35.0 nm | 33.7 nm |
| 6th Layer | $SiO_2$ | 49.4 nm | 49.4 nm | 70.9 nm | 70.9 nm | 68.4 nm |
| 7th Layer | $HfO_2$ | 32.0 nm | 32.0 nm | 35.4 nm | 35.4 nm | 34.1 nm |
| 8th Layer | $SiO_2$ | 52.3 nm | 52.3 nm | 48.9 nm | 48.9 nm | 47.1 nm |
| 9th Layer | $HfO_2$ | 38.0 nm | 38.0 nm | 30.9 nm | 30.9 nm | 29.8 nm |
| 10th Layer | $SiO_2$ | 53.8 nm | 53.8 nm | 42.5 nm | 42.5 nm | 41.0 nm |
| 11th Layer | $HfO_2$ | 31.5 nm | 31.5 nm | 31.3 nm | 31.3 nm | 30.2 nm |
| 12th Layer | $SiO_2$ | 48.0 nm | 48.0 nm | 53.5 nm | 53.5 nm | 51.6 nm |
| 13th Layer | $HfO_2$ | 30.0 nm | 30.0 nm | 43.2 nm | 43.2 nm | 41.6 nm |
| 14th Layer | $SiO_2$ | 50.5 nm | 50.5 nm | 61.5 nm | 61.5 nm | 59.3 nm |
| 15th Layer | $HfO_2$ | 42.0 nm | 42.0 nm | 29.3 nm | 29.3 nm | 28.2 nm |
| 16th Layer | $SiO_2$ | 51.3 nm | 51.3 nm | 44.0 nm | 44.0 nm | 42.4 nm |
| 17th Layer | $HfO_2$ | 28.9 nm | 28.9 nm | 30.5 nm | 30.5 nm | 29.4 nm |
| 18th Layer | $SiO_2$ | 46.1 nm | 46.1 nm | 42.7 nm | 42.7 nm | 41.2 nm |
| 19th Layer | $HfO_2$ | 27.3 nm | 27.3 nm | 29.2 nm | 29.2 nm | 28.2 nm |
| 20th Layer | $SiO_2$ | 44.6 nm | 44.6 nm | 41.8 nm | 41.8 nm | 40.3 nm |
| 21st Layer | $HfO_2$ | 26.4 nm | 26.4 nm | 29.8 nm | 29.8 nm | 28.7 nm |
| 22nd Layer | $SiO_2$ | 42.1 nm | 42.1 nm | 41.0 nm | 41.0 nm | 39.6 nm |
| 23rd Layer | $HfO_2$ | 25.8 nm | 25.8 nm | 29.7 nm | 29.7 nm | 28.6 nm |
| 24th Layer | $SiO_2$ | 42.1 nm | 42.1 nm | 41.0 nm | 41.0 nm | 39.6 nm |
| 25th Layer | $HfO_2$ | 26.4 nm | 26.4 nm | 29.2 nm | 29.2 nm | 28.1 nm |
| 26th Layer | $SiO_2$ | 43.6 nm | 43.6 nm | 41.6 nm | 41.6 nm | 40.1 nm |
| 27th Layer | $HfO_2$ | 26.8 nm | 26.8 nm | 28.9 nm | 28.9 nm | 27.9 nm |
| 28th Layer | $SiO_2$ | 43.8 nm | 43.8 nm | 42.9 nm | 42.9 nm | 41.4 nm |
| 29th Layer | $HfO_2$ | 26.7 nm | 26.7 nm | 28.6 nm | 28.6 nm | 27.6 nm |
| 30th Layer | $SiO_2$ | 42.5 nm | 42.5 nm | 42.4 nm | 42.4 nm | 40.9 nm |
| 31st Layer | $HfO_2$ | 26.4 nm | 26.4 nm | 29.6 nm | 29.6 nm | 28.5 nm |
| 32nd Layer | $SiO_2$ | 41.8 nm | 41.8 nm | 42.0 nm | 42.0 nm | 40.5 nm |
| 33rd Layer | $HfO_2$ | 26.8 nm | 26.8 nm | 29.0 nm | 29.0 nm | 27.9 nm |
| 34th Layer | $SiO_2$ | 42.2 nm | 42.2 nm | 41.1 nm | 41.1 nm | 39.7 nm |
| 35th Layer | $HfO_2$ | 28.5 nm | 28.5 nm | 32.7 nm | 32.7 nm | 31.5 nm |
| 36th Layer | $SiO_2$ | 42.9 nm | 42.9 nm | 35.8 nm | 35.8 nm | 34.5 nm |
| 37th Layer | $HfO_2$ | 32.8 nm | 32.8 nm | 32.4 nm | 32.4 nm | 31.2 nm |
| 38th Layer | $SiO_2$ | 76.9 nm | 76.9 nm | 87.1 nm | 87.1 nm | 84.0 nm |
| Air Side | | | | | | |

Production Example 5

First, a synthetic quartz glass substrate (manufactured by USTRON Corporation) was prepared as a transparent substrate. Subsequently, a dielectric multilayer film was deposited by sputtering on a principal surface on one side of the prepared transparent substrate. Specifically, first, a hafnium target was sputtered using an argon gas and an oxygen gas as carrier gases, and thus a hafnium oxide film ($HfO_2$ film) was deposited on the principal surface on the one side of the transparent substrate. At this time, each of the flow rates of the argon gas and the oxygen gas was 100 sccm, and the target application power (power for deposition) was 4 kW. Subsequently, a silicon target was sputtered using the argon gas and the oxygen gas as the carrier gases, and thus a silicon oxide film ($SiO_2$ film) was deposited on the $HfO_2$ film. At this time, the flow rate of the argon gas and the oxygen gas was 100 sccm, and the target application power (power for deposition) was 4 kW. By repeating this operation, on the principal surface on the one side of the transparent substrate, the dielectric multilayer film including a film having a total of 39 layers was formed in which the $HfO_2$ film and the $SiO_2$ film were alternately laminated one layer by one layer so that the outermost layer was made of the $HfO_2$ film, and thus the transparent substrate with the film was produced. The substrate temperature was maintained at room temperature (20° C.) during the deposition.

The thickness of each layer in the transparent substrate with the film fabricated in Production Example 5 is as depicted in Table 2 below.

TABLE 2

| Glass Side | | Production Example 5 |
|---|---|---|
| 1st Layer | $HfO_2$ | 37 nm |
| 2nd Layer | $SiO_2$ | 43 nm |
| 3rd Layer | $HfO_2$ | 33 nm |
| 4th Layer | $SiO_2$ | 47 nm |
| 5th Layer | $HfO_2$ | 37 nm |
| 6th Layer | $SiO_2$ | 69 nm |
| 7th Layer | $HfO_2$ | 36 nm |
| 8th Layer | $SiO_2$ | 46 nm |
| 9th Layer | $HfO_2$ | 31 nm |
| 10th Layer | $SiO_2$ | 45 nm |
| 11th Layer | $HfO_2$ | 31 nm |
| 12th Layer | $SiO_2$ | 50 nm |
| 13th Layer | $HfO_2$ | 44 nm |
| 14th Layer | $SiO_2$ | 62 nm |
| 15th Layer | $HfO_2$ | 30 nm |
| 16th Layer | $SiO_2$ | 44 nm |
| 17th Layer | $HfO_2$ | 30 nm |
| 18th Layer | $SiO_2$ | 43 nm |
| 19th Layer | $HfO_2$ | 30 nm |
| 20th Layer | $SiO_2$ | 42 nm |
| 21st Layer | $HfO_2$ | 30 nm |
| 22nd Layer | $SiO_2$ | 41 nm |
| 23rd Layer | $HfO_2$ | 30 nm |
| 24th Layer | $SiO_2$ | 41 nm |
| 25th Layer | $HfO_2$ | 29 nm |
| 26th Layer | $SiO_2$ | 42 nm |
| 27th Layer | $HfO_2$ | 29 nm |
| 28th Layer | $SiO_2$ | 43 nm |
| 29th Layer | $HfO_2$ | 28 nm |
| 30th Layer | $SiO_2$ | 42 nm |
| 31st Layer | $HfO_2$ | 29 nm |
| 32nd Layer | $SiO_2$ | 43 nm |
| 33rd Layer | $HfO_2$ | 30 nm |
| 34th Layer | $SiO_2$ | 41 nm |
| 35th Layer | $HfO_2$ | 31 nm |
| 36th Layer | $SiO_2$ | 37 nm |
| 37th Layer | $HfO_2$ | 31 nm |
| 38th Layer | $SiO_2$ | 76 nm |
| 39th Layer | $HfO_2$ | 5 nm |
| Air Side | | |

Production Example 6

A transparent substrate with a film was produced in the same manner as that in Production Example 1 except that a molten quartz glass substrate (manufactured by USTRON Corporation) was used as a transparent substrate and the deposition was performed to cause each layer to have the film thickness as depicted in Table 1 above.

Examples 1 to 17 and Comparative Examples 1 to 4

In Example 1, an optical filter was produced by heating the transparent substrate with the film produced in Production Example 1 at a temperature of 500° C. for 60 minutes under atmospheric environment. Likewise, in each of Examples 2 to 17, an optical filter was produced by heating the transparent substrate with the film produced in each of Production Examples at the temperature and for the period of time depicted in Table 3 below under atmospheric environment. As depicted in Table 3 below, in Comparative Examples 1 to 4, the transparent substrate with the film produced in each Production Example was used as it was as an optical filter without being heated.

Evaluation

X-Ray Diffraction Measurement

The optical filters of Examples 1 to 7 and 9 to 17 and Comparative Examples 1 to 4 were subjected to X-ray diffraction measurement using a wide angle X-ray diffraction technique. As an X-ray diffractometer, “SmartLab”, which is a product of Rigaku Corporation, was used. The measurement was performed using CuKα radiation (wavelength of 1.5418 Å) as a radiation source under the conditions of a scanning axis being 2θ/ω), a measurement range being 10 degrees to 65 degrees, a scanning rate being 2 degrees/min, a tube current being 200 mA, and a tube voltage being 45 kV. An example of X-ray diffraction spectra of the produced optical filters is depicted in FIG. 2.

Figure 2:
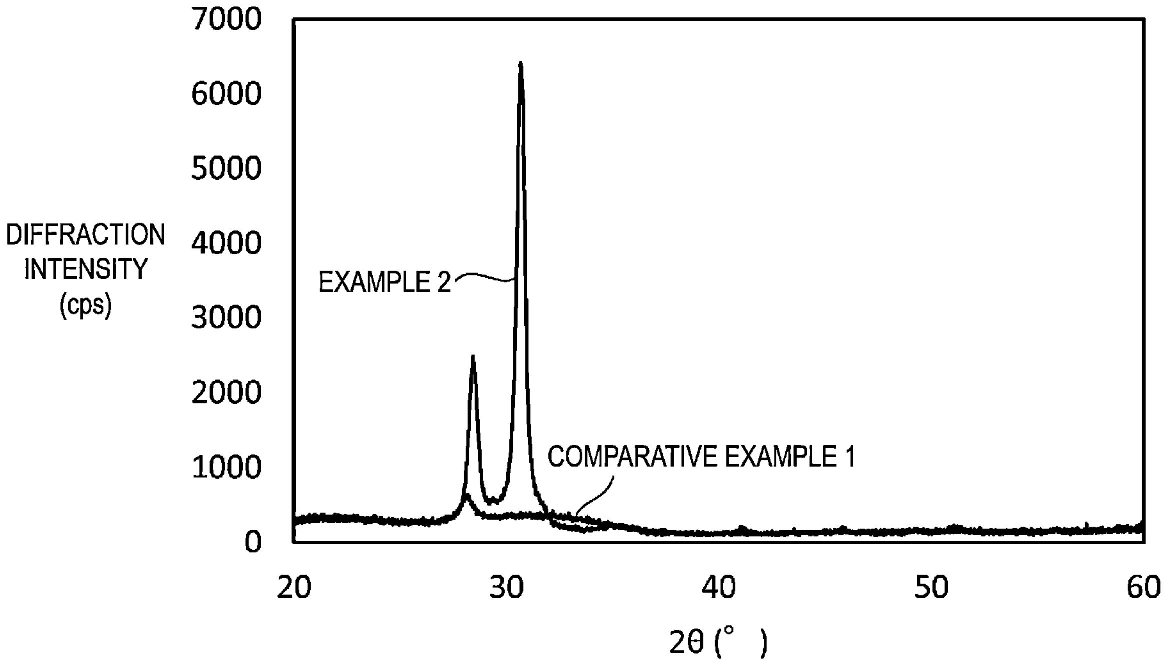
FIG. 2 is a diagram illustrating X-ray diffraction spectra of optical filters produced in Example 2 and Comparative Example 1.

FIG. 2 is a diagram illustrating X-ray diffraction spectra of the optical filters produced in Example 2 and Comparative Example 1. As illustrated in FIG. 2, in the X-ray diffraction spectrum of Example 2, a diffraction peak by the (1 1 1) crystal plane derived from a cubic hafnium oxide crystal was observed in the vicinity of 2θ being 30.7 degrees, and a diffraction peak by the (−1 1 1) crystal plane derived from a monoclinic hafnium oxide crystal was observed in the vicinity of 2θ being 28.4 degrees. On the other hand, in Comparative Example 1, no diffraction peak by the (1 1 1) crystal plane derived from the cubic hafnium oxide crystal was observed.

Likewise, the optical filters of Examples 1, 3 to 7 and 9 to 17, and Comparative Examples 2 to 4 were also subjected to X-ray diffraction measurement to determine a peak integrated intensity Ic of a diffraction peak by the (1 1 1) crystal plane derived from a cubic hafnium oxide crystal, a peak integrated intensity Im of a diffraction peak by the (−1 1 1)

crystal plane derived from a monoclinic hafnium oxide crystal, and a ratio Ic/Im. The results are presented in Table 3 given below.

Spectral Transmittance

The spectral transmittance of each of the optical filters of Examples 1 to 17 and Comparative Examples 1 to 4 was measured using a spectral transmittance meter (manufactured by Hitachi High-Tech Corporation, Product Number "UH4150"). Specifically, the incident angle (angle of incidence) was set to 0 degrees, and the measurement wavelength was from 190 nm to 400 nm. An example of transmission spectra of the produced optical filters is depicted in FIG. 3.

Figure 3:
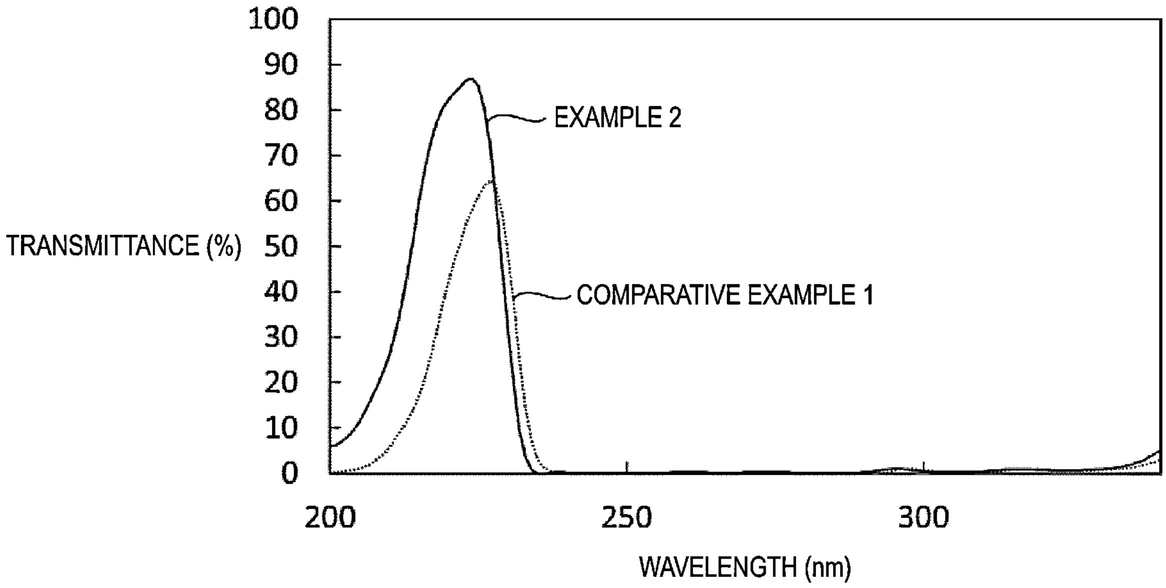
FIG. 3 is a diagram illustrating transmission spectra of optical filters produced in Example 2 and Comparative Example 1.

FIG. 3 is a diagram illustrating transmission spectra of the optical filters produced in Example 2 and Comparative Example 1. As illustrated in FIG. 3, in Example 2, it can be confirmed that the minimum value of the spectral transmittance in a wavelength range from 220 nm to 225 nm was increased. On the other hand, in Comparative Example 1, the minimum value of the spectral transmittance in a wavelength range from 220 nm to 225 nm was unable to be sufficiently increased. In both Example 2 and Comparative Example 1, it is understood that the maximum value of the spectral transmittance in a wavelength range from 240 nm to 320 nm is lowered.

Likewise, as for the optical filters of Examples 1 and 3 to 17 as well as Comparative Examples 2 to 4, the spectral transmittance in a wavelength range from 220 nm to 225 nm and the spectral transmittance in a wavelength range from 240 nm to 320 nm were measured. As described above, the incident angle was set to be 0 degrees.

The results are presented in Table 3 given below.

TABLE 3

| | Transparent Substrate with Film | Heating Treatment | Diffraction Peak Intensity Ic | Diffraction Peak Intensity Im | Peak Ratio Ic/Im | Wavelength Range from 220 nm to 225 nm Minimum Transmittance (%) |
|---|---|---|---|---|---|---|
| Example 1 | Production Example 1 | 500° C. · 60 min | 4098 | 1521 | 2.69 | 84.0 |
| Example 2 | | 600° C. · 60 min | 4472 | 1783 | 2.51 | 82.3 |
| Example 3 | | 700° C. · 60 min | 3152 | 2030 | 1.55 | 80.1 |
| Comparative Example 1 | | Unburned | 0 | 362 | 0 | 42.2 |
| Example 4 | Production Example 2 | 600° C. · 60 min | 570 | 3946 | 0.14 | 62.3 |
| Comparative Example 2 | | Unburned | 0 | 2769 | 0 | 48.9 |
| Example 5 | Production Example 3 | 600° C. · 60 min | 3943 | 1497 | 2.63 | 77.3 |
| Comparative Example 3 | | Unburned | 0 | 235 | 0 | 40.4 |
| Example 6 | Production Example 4 | 600° C. · 60 min | 1070 | 6605 | 0.16 | 67.5 |
| Example 7 | | 800° C. · 60 min | 401 | 5753 | 0.07 | 69.7 |
| Comparative Example 4 | | Unburned | 0 | 2612 | 0 | 45.5 |
| Example 8 | Production Example 5 | 600° C. · 60 min | — | — | — | 80.0 |
| Example 9 | Production Example 6 | 525° C. · 60 min | 7593 | 1563 | 4.86 | 73.3 |
| Example 10 | | 550° C. · 60 min | 7797 | 1730 | 4.51 | 77.8 |
| Example 11 | | 575° C. · 60 min | 6354 | 1561 | 4.07 | 79.2 |
| Example 12 | | 600° C. · 60 min | 7566 | 1979 | 3.82 | 79.5 |
| Example 13 | | 650° C. · 60 min | 6511 | 2064 | 3.15 | 78.9 |
| Example 14 | | 700° C. · 60 min | 6230 | 2395 | 2.60 | 77.6 |
| Example 15 | | 750° C. · 60 min | 5217 | 2981 | 1.75 | 76.3 |
| Example 16 | | 800° C. · 60 min | 3352 | 3946 | 0.85 | 72.5 |
| Example 17 | | 600° C. · 600 min | 5128 | 3309 | 1.55 | 77.0 |

| | Wavelength Range from 240 nm to 320 nm Maximum Transmittance (%) | Transparent Substrate | Substrate Temperature |
|---|---|---|---|
| Example 1 | 1.0 | Synthetic quartz glass substrate (manufactured by USTRON Corporation) | Room temperature (20° C.) |
| Example 2 | 0.9 | | |
| Example 3 | 1.0 | | |
| Comparative Example 1 | 0.9 | | |
| Example 4 | 1.2 | | 270° C. |
| Comparative Example 2 | 0.8 | | |
| Example 5 | 2.4 | Molten quartz glass substrate (manufactured by USTRON Corporation) | Room temperature (20° C.) |
| Comparative Example 3 | 2.2 | | |
| Example 6 | 2.3 | Borosilicate glass substrate (manufactured by Nippon Electric Glass Co., Ltd., Product Number "BU-41") | |
| Example 7 | 2.3 | | |
| Comparative Example 4 | 2.1 | | |

TABLE 3-continued

| | | |
|---|---|---|
| Example 8 | 2.3 | Synthetic quartz glass substrate (manufactured by USTRON Corporation) |
| Example 9 | 2.4 | Molten quartz glass substrate (manufactured by USTRON Corporation) |
| Example 10 | 2.5 | |
| Example 11 | 2.4 | |
| Example 12 | 2.5 | |
| Example 13 | 2.5 | |
| Example 14 | 2.4 | |
| Example 15 | 2.5 | |
| Example 16 | 2.8 | |
| Example 17 | 2.6 | |

As is apparent from Table 3, in the optical filters of Examples 1 to 17, ultraviolet light having a wavelength from 220 nm to 225 nm was allowed to pass through effectively while the transmission of ultraviolet light in a wavelength range from 240 nm to 320 nm is suppressed. On the other hand, in the optical filters of Comparative Examples 1 to 4, ultraviolet light having a wavelength from 220 nm to 225 nm was unable to be sufficiently transmitted.

Erosion Test

The optical filters produced in Example 5 and Example 8 were immersed in 0.5-wt. % hydrofluoric acid (HF) to carry out erosion test. Examples of transmission spectra before and after the erosion are depicted in FIGS. 5 and 6.

Figure 5:
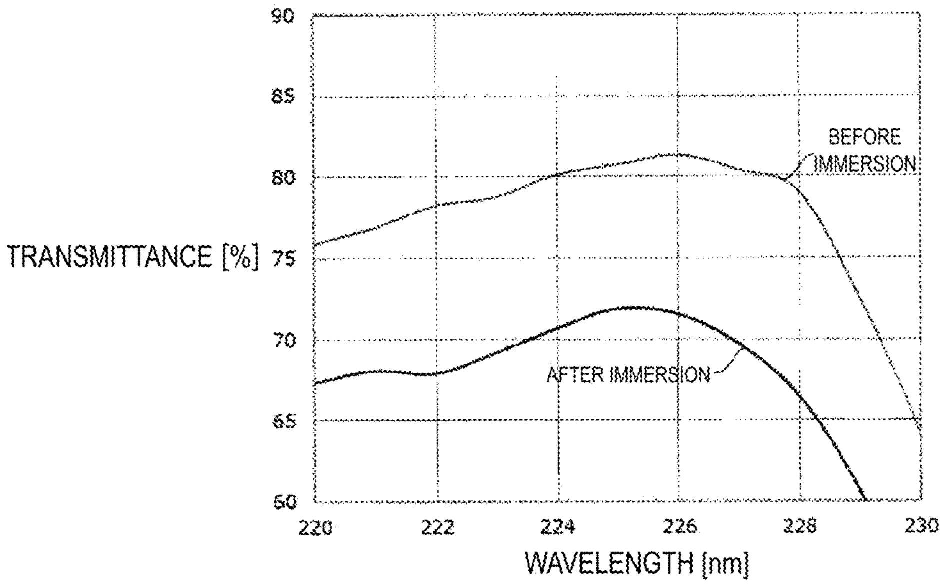
FIG. 5 is a diagram illustrating transmission spectra of an optical filter produced in Example 5 before and after the filter being immersed in hydrofluoric acid.

FIG. 5 is a diagram illustrating transmission spectra of the optical filter produced in Example 5 before and after the filter being immersed in the hydrofluoric acid. FIG. 6 is a diagram illustrating transmission spectra of the optical filter produced in Example 8 before and after the filter being immersed in the hydrofluoric acid. In FIGS. 5 and 6, the immersion time in the hydrofluoric acid was 240 seconds.

Figure 6:
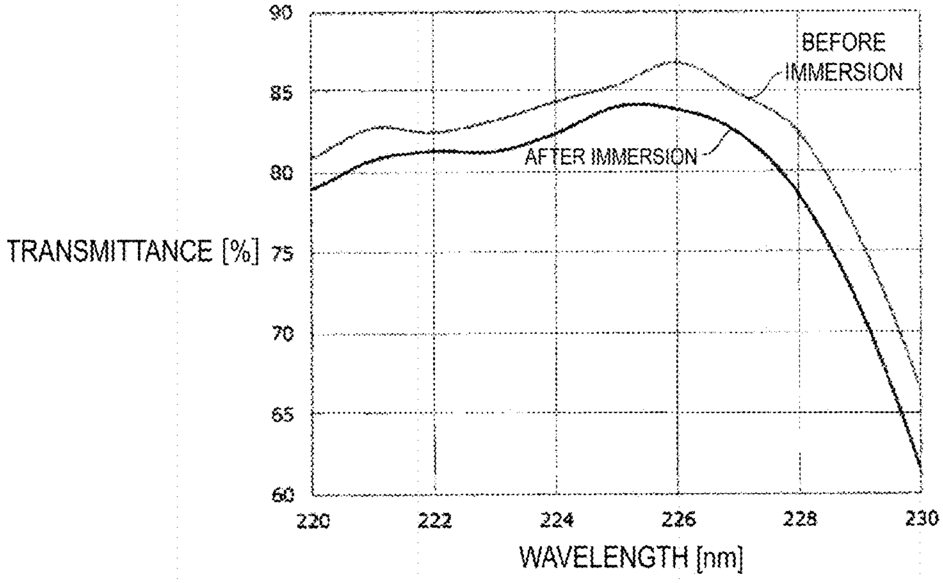
FIG. 6 is a diagram illustrating transmission spectra of an optical filter produced in Example 8 before and after the filter being immersed in hydrofluoric acid.

From FIGS. 5 and 6, it is understood that a change in transmittance in a wavelength range from 220 nm to 225 nm is suppressed in Example 8 with the outermost layer formed of a $HfO_2$ film as compared to Example 5 with the outermost layer formed of a $SiO_2$ film.

In Table 4 below, for the optical filters produced in Example 5 and Example 8, a relationship between the erosion amount and the change in transmittance in a wavelength range from 220 nm to 225 nm in each immersion time is depicted.

TABLE 4

| | Example 5 | | | Example 8 | | |
|---|---|---|---|---|---|---|
| | Outermost Layer | | | | | |
| | $SiO_2$ | | | $HfO_2$ | | |
| 0.5 wt. % HF immersion time (sec) | Film thickness (nm) | Erosion amount (nm) | Transmittance change (%, wavelength range from 220 to 225 nm) | Film thickness (nm) | Erosion amount (nm) | Transmittance change (%, wavelength range from 220 to 225 nm) |
| 0 | 87.1 | — | — | 5 | — | — |
| 30 | 85.6 | 1.5 | −1.2 | 5 | 0 | 0.4 |
| 60 | 83.6 | 3.5 | −2.7 | 5 | 0 | 0.2 |
| 120 | 81.1 | 6 | −4.9 | 5 | 0 | 0.0 |
| 240 | 75.6 | 11.5 | −9.3 | 4.5 | 0.5 | −1.7 |

From Table 4, it is understood that the erosion amount can be reduced and the change in transmittance in a wavelength range from 220 nm to 225 nm can be suppressed in Example 8 with the outermost layer formed of the $HfO_2$ film as compared to Example 5 with the outermost layer formed of the $SiO_2$ film.

Example 18

First, a synthetic quartz glass substrate (manufactured by USTRON Corporation) was prepared as a transparent substrate. Subsequently, a dielectric multilayer film was deposited by sputtering on a principal surface on one side of the prepared transparent substrate. Specifically, first, a hafnium target was sputtered using an argon gas and an oxygen gas as carrier gases, and thus a hafnium oxide film ($HfO_2$ film) was deposited on the principal surface on the one side of the transparent substrate. At this time, each of the flow rates of the argon gas and the oxygen gas was 100 sccm, and the target application power (power for deposition) was 4 kW. Subsequently, a silicon target was sputtered using the argon gas and the oxygen gas as the carrier gases, and thus a silicon oxide film ($SiO_2$ film) was deposited on the $HfO_2$ film. At this time, the flow rate of the argon gas and the oxygen gas was 100 sccm, and the target application power (power for deposition) was 4 kW. By repeating this operation, on the principal surface on the one side of the transparent substrate, the dielectric multilayer film including a film having a total of 38 layers was formed in which the $HfO_2$ film and the $SiO_2$ film were alternately laminated one layer by one layer, and thus the transparent substrate with the film was produced. The substrate temperature was maintained at room temperature (20° C.) during the deposition. Subsequently, an optical filter was produced by heating the transparent substrate with the film at a temperature of 500° C. for 60 minutes under atmospheric environment.

Example 19

An optical filter was fabricated in the same manner as that in Example 18 except that, at the time of fabricating a transparent substrate with a film, the thickness of each layer and the number of laminated layers of the film were changed as depicted in Table 5 given below.

Example 20

An optical filter was fabricated in the same manner as that in Example 18 except that, at the time of fabricating a transparent substrate with a film, the thickness of each layer and the number of laminated layers of the film were changed as depicted in Table 5 below, and the produced transparent substrate with the film was heated at a temperature of 550° C. for 60 minutes under atmospheric environment.

Example 21

An optical filter was fabricated in the same manner as that in Example 18 except that, at the time of fabricating a transparent substrate with a film, the thickness of each layer and the number of laminated layers of the film were changed as depicted in Table 5 below, and the produced transparent substrate with the film was heated at a temperature of 600° C. for 60 minutes under atmospheric environment.

Example 22

An optical filter was fabricated in the same manner as that in Example 18 except that, at the time of fabricating a transparent substrate with a film, the thickness of each layer and the number of laminated layers of the film were changed as depicted in Table 5 below, and the produced transparent substrate with the film was heated at a temperature of 450° C. for 60 minutes under atmospheric environment.

Example 23

An optical filter was fabricated in the same manner as that in Example 22 except that, at the time of fabricating a transparent substrate with a film, the thickness of each layer and the number of laminated layers of the film were changed as depicted in Table 5 below, and the target application power (power for deposition) was 3.5 kW at the time of depositing the hafnium oxide film ($HfO_2$ film).

Example 24

An optical filter was fabricated in the same manner as that in Example 22 except that, at the time of fabricating a transparent substrate with a film, the thickness of each layer and the number of laminated layers of the film were changed as depicted in Table 5 below, and the target application power (power for deposition) was 3 kW at the time of depositing the hafnium oxide film ($HfO_2$ film).

Example 25

An optical filter was produced in the same manner as that in Example 23 except that, at the time of fabricating a transparent substrate with a film, the thickness of each layer and the number of laminated layers of the film were changed as depicted in Table 5 below.

TABLE 5

| Number of Layers from Transparent Substrate Side | Film Material | Example 18 | Example 19 | Example 20 | Example 21 | Example 22 | Example 23 | Example 24 | Example 25 |
|---|---|---|---|---|---|---|---|---|---|
| 1st Layer | $HfO_2$ | 35.6 nm | 6.5 nm | 25.3 nm | 33.9 nm | 17.2 nm | 6.4 nm | 16.7 nm | 35.6 nm |
| 2nd Layer | $SiO_2$ | 47.3 nm | 83.3 nm | 135.4 nm | 56.2 nm | 73.3 nm | 79.2 nm | 68.7 nm | 47.3 nm |
| 3rd Layer | $HfO_2$ | 30.1 nm | 12.7 nm | 21.8 nm | 25.9 nm | 10.3 nm | 8.5 nm | 20.9 nm | 30.1 nm |
| 4th Layer | $SiO_2$ | 47.8 nm | 129.4 nm | 49.7 nm | 59.4 nm | 64.0 nm | 142.7 nm | 54.9 nm | 47.8 nm |
| 5th Layer | $HfO_2$ | 29.0 nm | 31.2 nm | 23.2 nm | 36.5 nm | 11.8 nm | 13.4 nm | 22.5 nm | 29.0 nm |
| 6th Layer | $SiO_2$ | 65.1 nm | 37.4 nm | 53.5 nm | 62.4 nm | 59.8 nm | 63.4 nm | 60.3 nm | 65.1 nm |
| 7th Layer | $HfO_2$ | 41.9 nm | 35.2 nm | 19.7 nm | 26.4 nm | 18.9 nm | 15.4 nm | 25.2 nm | 41.9 nm |
| 8th Layer | $SiO_2$ | 50.9 nm | 32.5 nm | 60.8 nm | 56.2 nm | 55.6 nm | 63.7 nm | 65.8 nm | 50.9 nm |
| 9th Layer | $HfO_2$ | 29.8 nm | 36.8 nm | 14.5 nm | 27.6 nm | 21.3 nm | 12.6 nm | 25.3 nm | 29.8 nm |
| 10th Layer | $SiO_2$ | 46.7 nm | 17.3 nm | 56.0 nm | 188.3 nm | 53.4 nm | 65.8 nm | 59.5 nm | 46.7 nm |
| 11th Layer | $HfO_2$ | 29.5 nm | 34.6 nm | 21.4 nm | 25.8 nm | 21.8 nm | 7.9 nm | 22.9 nm | 29.5 nm |
| 12th Layer | $SiO_2$ | 55.8 nm | 40.5 nm | 49.6 nm | 51.4 nm | 52.5 nm | 63.8 nm | 56.2 nm | 55.8 nm |
| 13th Layer | $HfO_2$ | 46.2 nm | 30.8 nm | 24.3 nm | 24.9 nm | 21.5 nm | 15.0 nm | 21.7 nm | 46.2 nm |
| 14th Layer | $SiO_2$ | 55.0 nm | 37.6 nm | 48.1 nm | 48.7 nm | 52.8 nm | 58.5 nm | 55.3 nm | 55.0 nm |
| 15th Layer | $HfO_2$ | 29.0 nm | 32.3 nm | 24.7 nm | 24.5 nm | 20.8 nm | 18.7 nm | 19.7 nm | 29.0 nm |
| 16th Layer | $SiO_2$ | 44.7 nm | 33.5 nm | 48.4 nm | 49.3 nm | 53.3 nm | 56.5 nm | 131.2 nm | 44.7 nm |
| 17th Layer | $HfO_2$ | 28.7 nm | 34.9 nm | 24.2 nm | 23.1 nm | 20.8 nm | 18.8 nm | 13.5 nm | 28.7 nm |
| 18th Layer | $SiO_2$ | 42.8 nm | 27.2 nm | 49.5 nm | 52.0 nm | 53.1 nm | 58.4 nm | 61.3 nm | 42.8 nm |
| 19th Layer | $HfO_2$ | 29.0 nm | 35.9 nm | 23.3 nm | 20.1 nm | 21.3 nm | 15.4 nm | 16.7 nm | 29.0 nm |
| 20th Layer | $SiO_2$ | 40.3 nm | 28.8 nm | 50.3 nm | 54.0 nm | 53.4 nm | 62.2 nm | 60.4 nm | 40.3 nm |
| 21st Layer | $HfO_2$ | 29.0 nm | 34.2 nm | 22.9 nm | 20.6 nm | 21.0 nm | 10.9 nm | 16.7 nm | 29.0 nm |
| 22nd Layer | $SiO_2$ | 40.4 nm | 35.8 nm | 49.3 nm | 52.0 nm | 62.0 nm | 60.9 nm | 60.7 nm | 40.4 nm |
| 23rd Layer | $HfO_2$ | 29.1 nm | 31.9 nm | 23.9 nm | 22.7 nm | 15.9 nm | 17.6 nm | 14.2 nm | 29.1 nm |
| 24th Layer | $SiO_2$ | 42.3 nm | 39.2 nm | 48.8 nm | 50.5 nm | 194.6 nm | 56.1 nm | 133.7 nm | 42.3 nm |
| 25th Layer | $HfO_2$ | 28.8 nm | 31.3 nm | 24.4 nm | 23.0 nm | 22.8 nm | 20.9 nm | 16.2 nm | 28.8 nm |
| 26th Layer | $SiO_2$ | 41.9 nm | 46.4 nm | 50.1 nm | 51.2 nm | 62.3 nm | 54.8 nm | 61.2 nm | 41.9 nm |
| 27th Layer | $HfO_2$ | 28.2 nm | 37.4 nm | 24.2 nm | 21.6 nm | 22.2 nm | 21.7 nm | 16.1 nm | 28.2 nm |
| 28th Layer | $SiO_2$ | 41.9 nm | 65.5 nm | 63.8 nm | 55.2 nm | 66.6 nm | 60.7 nm | 65.7 nm | 41.9 nm |
| 29th Layer | $HfO_2$ | 28.4 nm | 33.7 nm | 7.7 nm | 17.1 nm | 32.2 nm | 26.7 nm | 8.1 nm | 28.4 nm |
| 30th Layer | $SiO_2$ | 42.2 nm | 44.7 nm | 122.2 nm | 59.8 nm | 67.3 nm | 72.7 nm | 140.9 nm | 42.2 nm |
| 31st Layer | $HfO_2$ | 29.2 nm | 31.0 nm | 26.3 nm | 14.7 nm | 24.9 nm | 24.4 nm | 8.1 nm | 29.2 nm |
| 32nd Layer | $SiO_2$ | 42.3 nm | 51.2 nm | 50.4 nm | 59.4 nm | 271.8 nm | 60.3 nm | 69.1 nm | 42.3 nm |
| 33rd Layer | $HfO_2$ | 28.6 nm | 30.7 nm | 26.0 nm | 18.2 nm | 20.4 nm | 21.1 nm | 15.6 nm | 28.6 nm |
| 34th Layer | $SiO_2$ | 42.0 nm | 67.2 nm | 49.8 nm | 57.8 nm | 69.7 nm | 62.3 nm | 248.8 nm | 42.0 nm |
| 35th Layer | $HfO_2$ | 32.4 nm | 34.8 nm | 27.2 nm | 18.3 nm | 14.9 nm | 23.2 nm | | 32.4 nm |
| 36th Layer | $SiO_2$ | 32.3 nm | 54.0 nm | 56.2 nm | 63.3 nm | 25.6 nm | 185.4 nm | | 32.3 nm |
| 37th Layer | $HfO_2$ | 35.8 nm | 29.8 nm | 33.0 nm | 9.8 nm | | 11.8 nm | | 35.8 nm |
| 38th Layer | $SiO_2$ | 83.2 nm | 20.4 nm | 69.7 nm | 71.5 nm | | 78.2 nm | | 83.2 nm |

TABLE 5-continued

| Number of Layers from Transparent Substrate Side | Film Material | Example 18 | Example 19 | Example 20 | Example 21 | Example 22 | Example 23 | Example 24 | Example 25 |
|---|---|---|---|---|---|---|---|---|---|
| 39th Layer | $HfO_2$ | | | 31.1 nm | 6.2 nm | | 14.8 nm | | |
| 40th Layer | $SiO_2$ | | | 53.7 nm | 101.2 nm | | 24.9 nm | | |
| 41st Layer | $HfO_2$ | | | 33.9 nm | | | 33.9 nm | | |
| 42nd Layer | $SiO_2$ | | | 21.0 nm | | | 21.0 nm | | |
| Total of Layers (layers) | | 38 Layers | 38 Layers | 42 Layers | 40 Layers | 36 Layers | 42 Layers | 34 Layers | 38 Layers |

Comparative Example 5

A dielectric multilayer film was deposited by sputtering on a principal surface on one side of a prepared transparent substrate in the same manner as that in Example 18. Specifically, first, an aluminum target was sputtered using an argon gas and an oxygen gas as carrier gases, and thus an aluminum oxide film ($Al_2O_3$ film) was deposited on the principal surface on the one side of the transparent substrate. At this time, the flow rate of the argon gas was 100 ccm, the flow rate of the oxygen gas was 20 ccm, and the target application power (power for deposition) was 4 kW. Subsequently, a silicon target was sputtered using the argon gas and oxygen gas as the carrier gases, and thus a silicon oxide film ($SiO_2$ film) was deposited on the $Al_2O_3$ film. At this time, each of the flow rates of the argon gas and the oxygen gas was 100 sccm, and the target application power (power for deposition) was 4 kW. By repeating this operation, on the principal surface on the one side of the transparent substrate, the dielectric multilayer film including a film having a total of 230 layers with a total thickness of 10 μm was formed in which the $Al_2O_3$ film and the $SiO_2$ film were alternately laminated one layer by one layer, and thus the transparent substrate with the film (optical filter) was produced. The substrate temperature was maintained at room temperature (20° C.) during the deposition.

Comparative Example 6

A dielectric multilayer film was deposited by sputtering on a principal surface on one side of a prepared transparent substrate in the same manner as that in Example 18. Specifically, first, a hafnium target was sputtered using an argon gas and an oxygen gas as carrier gases, and thus a hafnium oxide film ($HfO_2$ film) was deposited on the principal surface on the one side of the transparent substrate. At this time, each of the flow rates of the argon gas and the oxygen gas was 100 ccm, and the target application power (power for deposition) was 3 kW. Subsequently, a silicon target was sputtered using the argon gas and the oxygen gas as the carrier gases, and thus a silicon oxide film ($SiO_2$ film) was deposited on the $HfO_2$ film. At this time, the flow rate of the argon gas and the oxygen gas was 100 sccm, and the target application power (power for deposition) was 4 kW. By repeating this operation, on the principal surface on the one side of the transparent substrate, the dielectric multilayer film including a film having a total of 33 layers with a total thickness of 1700 nm was formed in which the $HfO_2$ film and the $SiO_2$ film were alternately laminated one layer by one layer, and thus the transparent substrate with the film was produced. The substrate temperature was maintained at room temperature (20° C.) during the deposition. Subsequently, an optical filter was produced by heating the transparent substrate with the film at a temperature of 425° C. for 60 minutes under atmospheric environment.

Evaluation

X-Ray Diffraction Measurement

The optical filters of Examples 18 to 25 and Comparative Examples 5 to 6 were subjected to X-ray diffraction measurement using a wide angle X-ray diffraction technique. As an X-ray diffractometer, "SmartLab", which is a product of Rigaku Corporation, was used. The measurement was performed using CuKα radiation (wavelength of 1.5418 Å) as a radiation source under the conditions of a scanning axis being 2θθ/ω), a measurement range being 10 degrees to 65 degrees, a scanning rate being 2 degrees/min, a tube current being 200 mA, and a tube voltage being 45 kV.

Among the produced X-ray diffraction spectra, a spectrum in which the diffraction peak by the (1 1 1) crystal plane derived from a cubic hafnium oxide crystal was larger than the diffraction peak by the (−1 1 1) crystal plane derived from a monoclinic hafnium oxide crystal was evaluated as GOOD, and a spectrum in which the diffraction peak by the (1 1 1) crystal plane derived from a cubic hafnium oxide crystal was smaller than the diffraction peak by the (−1 1 1) crystal plane derived from a monoclinic hafnium oxide crystal was evaluated as POOR.

By using the produced X-ray diffraction spectra, the peak integrated intensity Ic of the diffraction peak by the (1 1 1) crystal plane derived from the cubic hafnium oxide crystal, the peak integrated intensity Im of the diffraction peak by the (−1 1 1) crystal plane derived from the monoclinic hafnium oxide crystal, and the ratio Ic/Im were determined.

Spectral Transmittance

The spectral transmittance of each of the optical filters of Examples 18 to 25 and Comparative Examples 5 to 6 was measured using a spectral transmittance meter (manufactured by Hitachi High-Tech Corporation, Product Number "UH4150"). Specifically, the incident angle (AOI) was set to 0, 25, 30, 40, or 50 degrees, and the measurement wavelength was from 190 nm to 400 nm. An example of transmission spectra of an produced optical filter is depicted in FIG. 8.

Figure 8:
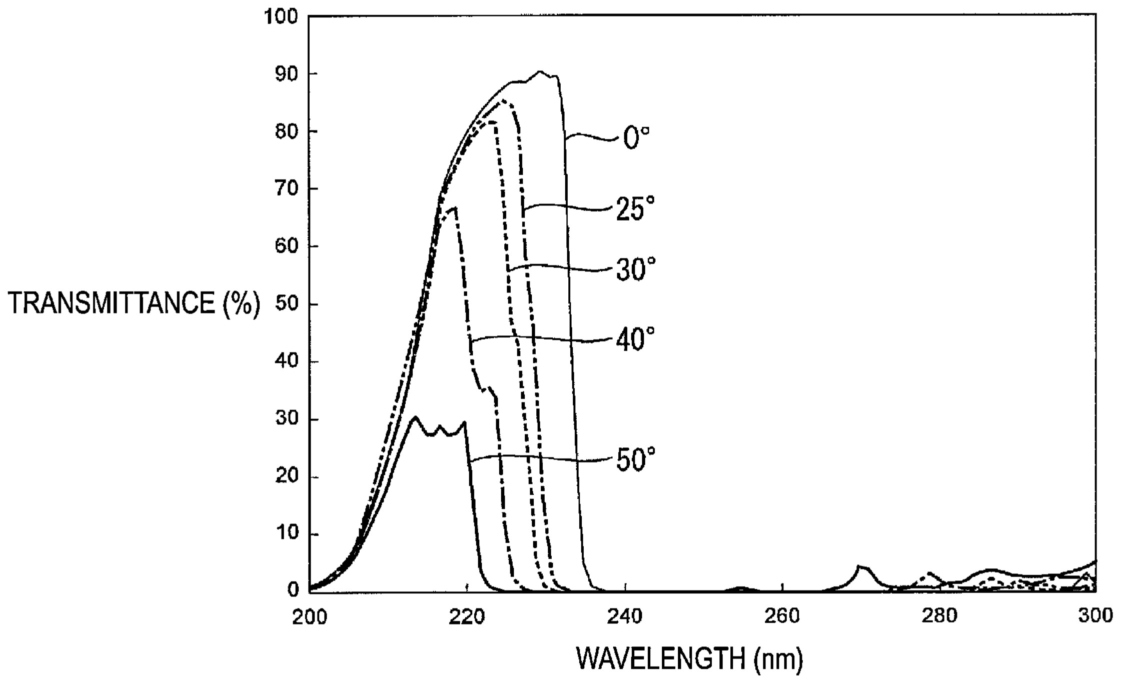
FIG. 8 is a diagram illustrating transmission spectra with respective incident angles of an optical filter produced in Example 18.

FIG. 8 is a diagram illustrating transmission spectra at respective incident angles of the optical filter produced in Example 18. As illustrated in FIG. 8, in Example 18, it is understood that, even when the incident angle is increased, high spectral transmittance can be more effectively maintained at a wavelength of 222 nm and the maximum value of the spectral transmittance in a wavelength range from 237 nm to 280 nm can be further decreased.

Likewise, as for the optical filters of Examples 18 to 25 and Comparative Examples 5 to 6, the spectral transmittance at a wavelength of 222 nm and the spectral transmittance (maximum transmittance) in a wavelength range from 237 nm to 280 nm were measured with respective incident angles.

The measurement results are presented in Table 6 given below. In Table 6 below, a ratio of spectral transmittance $T_{30}$ at the wavelength of 222 nm with an incident angle of 30 degrees to spectral transmittance $T_0$ at the wavelength of 222 nm with an incident angle of 0 degrees ($T_{30}/T_0$) is additionally presented. In Table 6 below, the minimum transmittance in a wavelength range from 220 nm to 225 nm is also presented. A total thickness $t_H$ of the high refractive index film ($HfO_2$ thickness), a total thickness $t_L$ of the low refractive index film ($SiO_2$ thickness), and a film thickness ratio ($t_H/t_L$) are also presented.

TABLE 6

| | $HfO_2$ Thickness | $SiO_2$ Thickness | Film Thickness Ratio | Spectral Transmittance at 222 nm (%) | | | | | Minimum Transmittance in Wavelength Range from 220 to 225 nm (%) |
|---|---|---|---|---|---|---|---|---|---|
| | nm | nm | ($t_H/t_L$) | AOI = 0° | AOI = 30° | AOI = 40° | AOI = 50° | $T_{30}/T_0$ | AOI = 0° |
| Example 18 | 598 | 905 | 0.661 | 82.6 | 80.1 | 34.7 | — | 0.97 | 77.8 |
| Example 19 | 586 | 892 | 0.657 | 81.5 | 77.9 | 51.0 | 26.4 | 0.96 | 77.2 |
| Example 20 | 503 | 1236 | 0.407 | 82.8 | 76.5 | 33.4 | — | 0.92 | 77.8 |
| Example 21 | 441 | 1300 | 0.339 | 82.6 | 76.9 | 18.0 | — | 0.93 | 77.8 |
| Example 22 | 360 | 1391 | 0.259 | 81.7 | 76.2 | 4.9 | 0.1 | 0.93 | 76.7 |
| Example 23 | 359 | 1452 | 0.247 | 79.7 | 72.3 | 1.6 | — | 0.91 | 73.9 |
| Example 24 | 300 | 1454 | 0.206 | 77.0 | 70.4 | 1.4 | — | 0.91 | 70.7 |
| Example 25 | 598 | 905 | 0.661 | 62.1 | 57.5 | 24.6 | 2.8 | 0.93 | 53.7 |
| Comparative Example 5 | — | — | — | 75 | Several % | Several % | — | Below 0.5 | — |
| Comparative Example 6 | 240 | 1460 | 0.164 | 85 | 35 | Several % | — | 0.41 | — |

| | Maximum Transmittance Wavelength Range from 237 to 280 nm (%) | | | | Maximum Transmittance in Wavelength Range from 240 nm to 320 nm (%) | X-Ray Diffraction Measurement | |
|---|---|---|---|---|---|---|---|
| | AOI = 0° | AOI = 30° | AOI = 40° | AOI = 50° | AOI = 0° | Evaluation | Ic/Im |
| Example 18 | 0.5 | 0.2 | 3.3 | — | 3.2 | GOOD | 2.7 |
| Example 19 | 0.9 | 2.1 | 2.7 | 3.8 | 3.0 | GOOD | 2.7 |
| Example 20 | 0.4 | 2.3 | 3.4 | — | 4.0 | GOOD | 2.6 |
| Example 21 | 0.7 | 2.7 | 3.9 | — | 4.0 | GOOD | 2.5 |
| Example 22 | 1.6 | 3.2 | 3.3 | 5.3 | 4.4 | GOOD | 1.3 |
| Example 23 | 2.0 | 3.4 | 3.6 | — | 4.5 | GOOD | 1.1 |
| Example 24 | 3.9 | 4.4 | 4.4 | — | 4.9 | POOR | 0.7 |
| Example 25 | 0.5 | 0.2 | 3.3 | 4.4 | 3.2 | GOOD | 1.1 |
| Comparative Example 5 | — | — | — | — | 17.8 | — | — |
| Comparative Example 6 | — | — | — | — | 21.5 | POOR | 0.2 |

As is apparent from Table 6, it is understood that, even when the incident angle is increased, high spectral transmittance can be more effectively maintained at the wavelength of 222 nm and the maximum value of the spectral transmittance in a wavelength range from 237 nm to 280 nm can be further reduced in the optical filters of Examples 18 to 25 as compared to Comparative Examples 5 and 6.

In the optical filters of Examples 18 to 25, the maximum value of the spectral transmittance in a wavelength range from 240 nm to 320 nm was measured by the same method as that in Example 1, and the maximum value was found to be 5% or less. In Comparative Examples 5 and 6, the maximum values were 17.8% and 21.5%, respectively.

REFERENCE SIGNS LIST

1, 21 Optical filter
1*a* Principal surface
2 Transparent substrate
2*a* First principal surface
2*b* Second principal surface
3, 23 Dielectric multilayer film
4 High refractive index film
5 Low refractive index film
26 Outermost layer
31 Sterilization device
32 Housing
33 Light source
34 Sterilization target object

The invention claimed is:

1. An optical filter, comprising:

a transparent substrate; and a dielectric multilayer film provided on the transparent substrate and containing hafnium oxide, wherein a minimum value of spectral transmittance in a wavelength range from 220 nm to 225 nm is 50% or more with an incident angle of 0 degrees, a maximum value of spectral transmittance in a wavelength range from 240 nm to 320 nm is 5% or less with an incident angle of 0 degrees, and the dielectric multilayer film contains a cubic hafnium oxide crystal.

2. The optical filter according to claim 1, wherein in X-ray diffraction measurement, a diffraction peak by a (1 1 1) crystal plane derived from the cubic hafnium oxide crystal is larger than a diffraction peak by a (−1 1 1) crystal plane derived from a monoclinic hafnium oxide crystal.

3. The optical filter according to claim 1, wherein the dielectric multilayer film includes a high refractive index film having a relatively high refractive index and a low refractive index film having a relatively low refractive index, and the high refractive index film contains the hafnium oxide.

4. The optical filter according to claim 3, wherein the low refractive index film contains silicon oxide.

5. The optical filter according to claim 1, wherein an outermost layer of the dielectric multilayer film is a film containing the hafnium oxide.

6. The optical filter according to claim 5, wherein a thickness of the outermost layer is 1 nm or more and 10 nm or less.

7. The optical filter according to claim 1, wherein a ratio ($T_{30}/T_0$) of spectral transmittance $T_{30}$ at a wavelength of 222 nm with an incident angle of 30 degrees to spectral transmittance $T_0$ at a wavelength of 222 nm with an incident angle of 0 degrees is 0.5 or more.

8. The optical filter according to claim 1, wherein the dielectric multilayer film includes a high refractive index film having a relatively high refractive index and a low refractive index film having a relatively low refractive index, and a ratio ($t_H/t_L$) of a total thickness $t_H$ of the high refractive index film to a total thickness tu of the low refractive index film is 0.2 or more.

9. The optical filter according to claim 8, wherein the ratio ($t_H/t_L$) of the total thickness $t_H$ of the high refractive index film to the total thickness tu of the low refractive index film is 0.5 or more.

10. The optical filter according to claim 1, wherein with an incident angle of 0 degrees, the minimum value of the spectral transmittance in a wavelength range from 220 nm to 225 nm is 50% or more, and the maximum value of the spectral transmittance in a wavelength range from 237 nm to 280 nm is 10% or less.

11. The optical filter according to claim 1, wherein the maximum value of the spectral transmittance in a wavelength range from 237 nm to 280 nm is 20% or less with an incident angle of 40 degrees.

12. A method for producing the optical filter according to claim 1, the method comprising:

forming a transparent substrate with a film by depositing a dielectric multilayer film on the transparent substrate by sputtering method, the dielectric multilayer film containing hafnium oxide; and heating the transparent substrate with the film at a temperature of 500° C. or higher.

13. The method for producing the optical filter according to claim 12, wherein the temperature for the heating of the transparent substrate with the film is 800° C. or lower.

14. A sterilization device for performing inactivation treatment on microorganisms to be treated, the sterilization device comprising:

a light source configured to emit light whose wavelength is in a wavelength range from 190 nm to 230 nm; and the optical filter according to claim 1.

15. The optical filter according to claim 1, wherein the dielectric multilayer film contains both the cubic hafnium oxide crystal and a monoclinic hafnium oxide crystal.

16. The optical filter according to claim 15, wherein a ratio Ic/Im of a peak integrated intensity Ic of the diffraction peak by the (1 1 1) crystal plane derived from the cubic hafnium oxide crystal to a peak integrated intensity Im of the diffraction peak by the (−1 1 1) crystal plane derived from the monoclinic hafnium oxide crystal is 0.1 or more.

17. The method for producing the optical filter according to claim 12, wherein a period of time of heating the transparent substrate with the film is 10 minutes or more.

* * * * *